United States Patent
Rosato et al.

(10) Patent No.: US 9,844,241 B2
(45) Date of Patent: Dec. 19, 2017

(54) SKI BOOT

(75) Inventors: Lorenzo Rosato, Asolo (IT); Giuseppe Rosato, Asolo (IT)

(73) Assignee: LA ROCCA SAS DI ROSATO EDOARDO E DEMIS, Asolo (TV) (IT)

( * ) Notice: Subject to any disclaimer, the term of this patent is extended or adjusted under 35 U.S.C. 154(b) by 0 days.

(21) Appl. No.: 13/996,475

(22) PCT Filed: Dec. 21, 2011

(86) PCT No.: PCT/EP2011/073675
§ 371 (c)(1),
(2), (4) Date: Jun. 20, 2013

(87) PCT Pub. No.: WO2012/085142
PCT Pub. Date: Jun. 28, 2012

(65) Prior Publication Data
US 2013/0283643 A1 Oct. 31, 2013

(30) Foreign Application Priority Data
Dec. 21, 2010 (IT) .............................. VI20100061 U

(51) Int. Cl.
*A43C 13/00* (2006.01)
*A43B 3/24* (2006.01)
(Continued)

(52) U.S. Cl.
CPC ............ *A43B 5/0484* (2013.01); *A43B 3/246* (2013.01); *A43B 5/0413* (2013.01);
(Continued)

(58) Field of Classification Search
CPC ....... A43B 5/04; A43B 5/0417; A43B 5/0401; A43B 5/0421; A43B 5/0403;
(Continued)

(56) References Cited

U.S. PATENT DOCUMENTS 2,394,454 A * 2/1946 Kappeler ............. A43B 13/223
36/59 C
3,003,777 A * 10/1961 Hilding ......................... 280/614
(Continued)

FOREIGN PATENT DOCUMENTS

DE 2906484 A1 * 1/1982
EP 0933034 A1 8/1999
(Continued)

OTHER PUBLICATIONS

"Ski binding explained". Everything Explained Today. URL="http://everything.explained.today/Ski_binding/". Accessed Feb 10, 2016.*
(Continued)

*Primary Examiner* — Jameson Collier
(74) *Attorney, Agent, or Firm* — Koppel, Patrick, Heybl & Philpott

(57) ABSTRACT

A ski boot with removable and interchangeable soles. In one embodiment, the ski boot has a hull with a shaped plate, a sole adapted to be removed from the hull with the sole having a front portion and a back portion that are separated from each other and constrained to the hull via fixing screws. The removable and interchangeable soles allows the ski boot to be configured for specific skiing disciplines and is compatible with ski bindings provided with a plurality of pins integral with the ski that are fitted into corresponding shaped recesses of the hull. The shaped recesses are positioned on the sides of the plate, which is fixedly constrained to the ski boot.

3 Claims, 7 Drawing Sheets

(51) Int. Cl.
  *A43B 5/04* (2006.01)
  *A43B 5/16* (2006.01)
  *A43B 13/36* (2006.01)
  *B29C 33/04* (2006.01)
  *B29C 45/17* (2006.01)
(52) U.S. Cl.
  CPC .......... *A43B 5/0423* (2013.01); *A43B 5/0496* (2013.01); *A43B 13/36* (2013.01); *B29C 33/04* (2013.01); *B29C 45/1753* (2013.01); *B29C 2045/1754* (2013.01)
(58) Field of Classification Search
  CPC ... A43B 5/0411; A43B 5/0484; A43B 5/0413; A43B 5/0423; A43B 5/0496; A43B 5/0492; A43B 5/0494; A43B 5/0498; A43B 5/0458; A43B 5/0474; A43B 3/246; A43B 13/26; A43B 13/36
  USPC .............. 36/15, 100, 115, 116, 117.1, 117.2, 36/117.3, 117.4, 122
  See application file for complete search history.

(56) References Cited

U.S. PATENT DOCUMENTS

| | | | |
|---|---|---|---|
| 3,824,713 A * | 7/1974 | Vaccari | 36/118.2 |
| 4,078,322 A | 3/1978 | Dalebout | |
| 4,351,120 A * | 9/1982 | Dalebout | 36/117.3 |
| 4,632,419 A * | 12/1986 | Zoor | 280/614 |
| 4,937,955 A * | 7/1990 | Bonaventure | 36/132 |
| 5,394,627 A * | 3/1995 | Eugler | 36/117.3 |
| 5,992,861 A * | 11/1999 | Piotrowski | 280/7.14 |
| 6,065,228 A * | 5/2000 | Begey et al. | 36/15 |
| 6,588,125 B2 * | 7/2003 | Proctor, Sr. | 36/117.1 |
| 6,609,313 B2 * | 8/2003 | Orso | 36/117.3 |
| 2005/0115117 A1 | 6/2005 | Morlin | |
| 2008/0184599 A1 * | 8/2008 | Ekberg | 36/117.3 |
| 2009/0113763 A1 * | 5/2009 | Narajowski et al. | 36/117.3 |
| 2009/0255149 A1 * | 10/2009 | Rigat | A43B 1/0018 36/117.3 |
| 2010/0257754 A1 * | 10/2010 | Trabucchi | 36/117.1 |

FOREIGN PATENT DOCUMENTS

| | | |
|---|---|---|
| EP | 1559457 A1 | 8/2005 |
| EP | 2201853 A1 | 6/2010 |
| EP | 2227974 A1 | 9/2010 |
| EP | 2250916 A1 | 11/2010 |
| FR | 2743990 A1 * | 8/1997 |
| WO | WO 0152679 A1 * | 7/2001 |
| WO | WO 2007058719 A2 * | 5/2007 |
| WO | WO 2007127969 A2 * | 11/2007 |
| WO | WO 2009/003904 A1 | 1/2009 |

OTHER PUBLICATIONS

International Search Report (Form PCT/ISA/210) for PCT/EP2011/073675, dated May 9, 2012.
Written Opinion (Form PCT/PEA/408) for PCT/EP2011/073675, dated Nov. 30, 2012.
Transmittal (PCT/PEA/416) & International Preliminary Report on Patentability (Form & PCT/PEA/409) for PCT/EP2011/073675, dated Jan. 29, 2013.
Applicant response to ISR and WO to European Patent Office dated Oct. 19, 2012.

* cited by examiner

SKI BOOT

DESCRIPTION

The present invention concerns a ski touring boot consisting of a hull and a set of removable and interchangeable soles, the boot being provided with an interconnection system between the soles and the hull that allows precision to be improved when the skier's energy pulses are transferred to the skis.

BACKGROUND ART

Ski touring skis are lighter than alpine skis and are provided with bindings that make it possible to release the heel to facilitate uphill climb movements and to lock it to go downhill.

In general, ski boots must comply with standards that vary depending on the individual skiing disciplines and in each discipline they are interconnected to the skis through coupling systems that are such as to allow the skier's energy pulse to be transferred rapidly and precisely to the skis.

In particular, ski touring boots suitable for going downhill have a shaped sole whose profile is complementary to a shim provided on the surface of the binding. Said elements constitute a constraint for purely lateral or longitudinal movements, while they can slide with respect to each other when they are subjected to a voluntary relative twist movement around the heel of the boot, thus eliminating the constraint existing between the boot and the binding. The underside of the sole is smooth and rigid, in such a way as to minimize friction between the ski and the boot when it is necessary to separate said elements quickly.

Instead, the ski touring boots suitable for going uphill typically have a tank sole in rubber or composite material, so as to increase friction between the sole and the ground and make it easier and safer to walk on the snow.

Among the different types of standard bindings used, the DYNAFIT® ski bindings standard is widespread, in which the binding is carried out by means of pins that are oriented crosswise and integral with the ski, and fit into recesses having a cylindrical profile, successively indicated as bushings, and provided laterally on the front of the boot. This type of binding localizes the operating point of the constraint, and therefore the point of transfer of the energy pulses exerted by the skier, on the connection between the pins of the binding and the bushings of the boot.

A first type of boots belonging to the known art and used for ski touring when going uphill includes a tank sole fixedly constrained to the hull of the boot. As shown in FIG. 1, on the front of the sole, in lateral position, the boot is provided with bushings that serve as seats for the pins of the DYNAFIT® ski binding. Ski boots with fixed sole have the disadvantage that they can be used for ski touring only when going uphill and not when going downhill.

In order to overcome said drawback, the patent WO 2009/003904 A1 discloses a boot that makes it possible to mount different sets of soles on the same hull, each set being in compliance with the standards that rule the different skiing disciplines, for example alpine skiing and ski touring. Each set of soles is made up of a front element and a back element that are separated from each other and removably fixed to plates that are fixedly constrained to the hull of the boot by means of fixing screws. In this way it is possible to use a single hull for different applications, according to the type of sole integrated therein. If a boot is improved for ski touring used for going uphill, the front element of the removable sole will be provided with the bushings, located laterally, that allow the boot to be constrained to the ski using the corresponding DYNAFIT® ski binding.

FIGS. 2 and 3 respectively illustrate ski touring boots used for going uphill and downhill, carried out according to the technical solution described above.

FIG. 4 shows the front element of the ski touring boot according to the known art and the front elements of the soles in compliance with the standards in force and used for going uphill and downhill, respectively.

The boot carried out according to the solution illustrated in FIG. 4 has the disadvantage of reducing the skier's control precision and rapidity when going uphill compared to the boot with fixed sole. The constraint system between the sole and the fixed plate of the hull, consisting of fixing screws, in fact can introduce a play between the two elements, due to misalignments and lack of homogeneity in size between the fixing screws and the corresponding seats provided in the removable sole and in the hull's plate. Said interconnection faults between the removable sole and the fixed plate can be generated during the sporting activity or already during assembly.

As the bushings of the boot are located on the removable sole, any play between the sole and the fixed plate of the hull involves a play between the ski and the boot, which limits the precision and rapidity with which the skier can transfer an energy pulse to the skis, with consequent reduced control and therefore less safety for the skier.

DESCRIPTION OF THE INVENTION

The present invention resolves the problem mentioned above posed by the ski boots of the known art, which are made up of a hull and a set of removable and interchangeable soles that are suited to comply with the standards that regulate the characteristics required of ski touring gear. Said problem is related to the presence of a play between the removable sole and the plate of the hull, which causes reduced precision and safety of the Nordic ski binding.

Improved safety and ease of use are achieved by the present invention concerning the use of a ski boot made up of a hull and a set of removable soles constrained to the hull on a plate through fixing screws, whose characteristics are in compliance with the contents of the first claim.

The ski boot carried out according to the present invention is characterized in that the arrangement of the bushings necessary to constrain the binding of the touring ski to the boot is such as to eliminate the reduction in ski control precision and rapidity resulting from the play due to imperfect correspondence between the screws for fixing the removable sole to the hull and the corresponding seats.

The proposed ski boot at the same time maintains the functionality and the advantages connected to the possibility to remove the boot sole, inserting alternative soles in compliance with the standards regulating the different skiing disciplines.

The boot carried out according to the present invention is thus particularly advantageous compared to the technical solutions of the state of the art, as it makes it possible to improve precision of the DYNAFIT® ski binding in boots adapted for going uphill in ski touring, at the same time maintaining the interchangeability of the sets of different soles.

The objects and advantages of the present invention will be highlighted in greater detail in the description of a particular embodiment of the invention, which is provided as an example without limitation, with reference to the attached drawings, wherein.

According to the embodiment described in figures from 5 to 8, the ski boot that is the subject of the present invention comprises a hull and one or more soles made up of a front element and a back element that are separated and removably fixed to plates that are fixedly constrained to the hull by means of fixing screws.

Figure 7A:
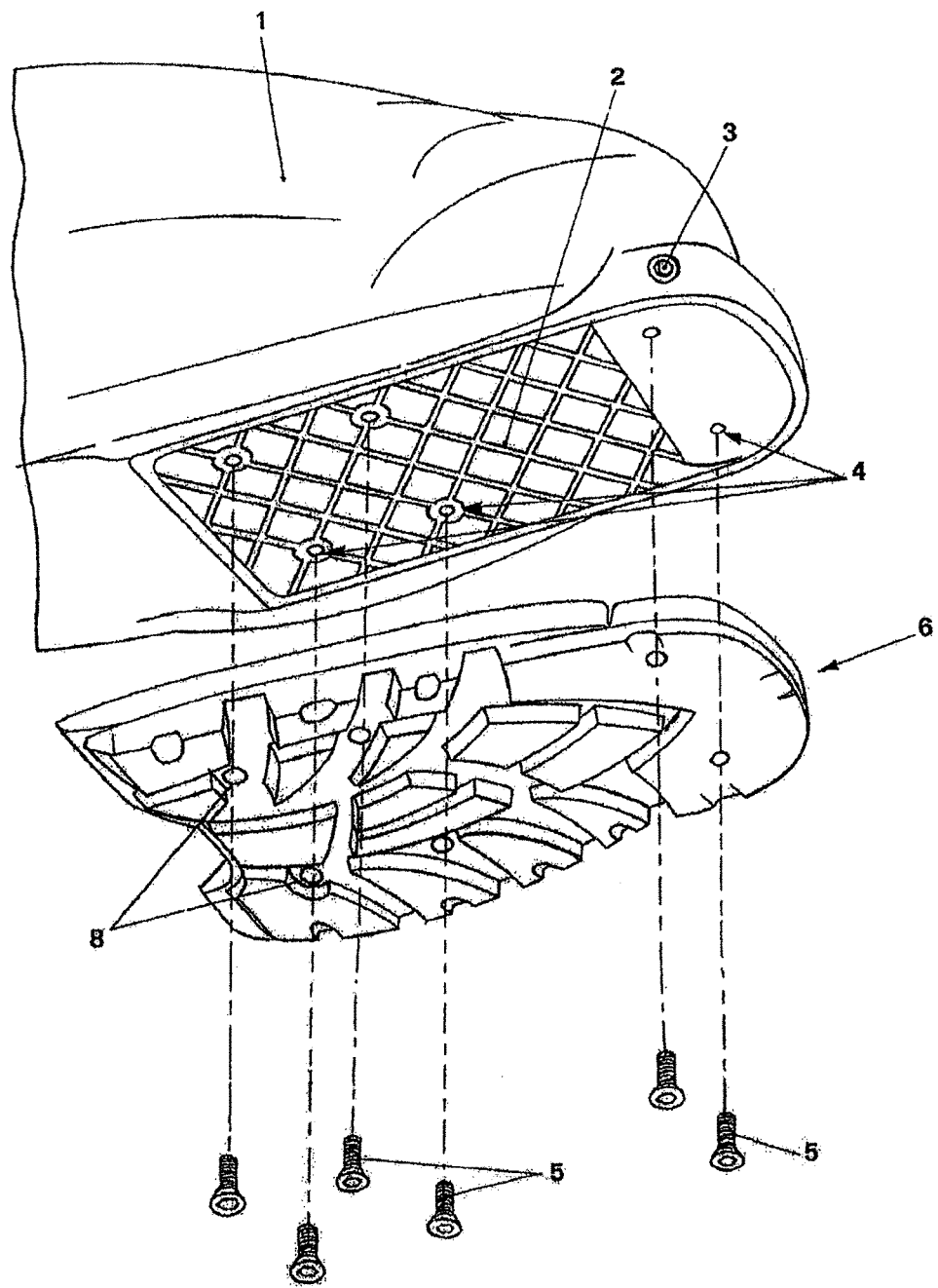
FIG. 7a shows an exploded view of the front of the ski boot carried out according to an embodiment of the present invention, wherein the hull and the front elements of the removable soles are illustrated separately.
Figure 7B:
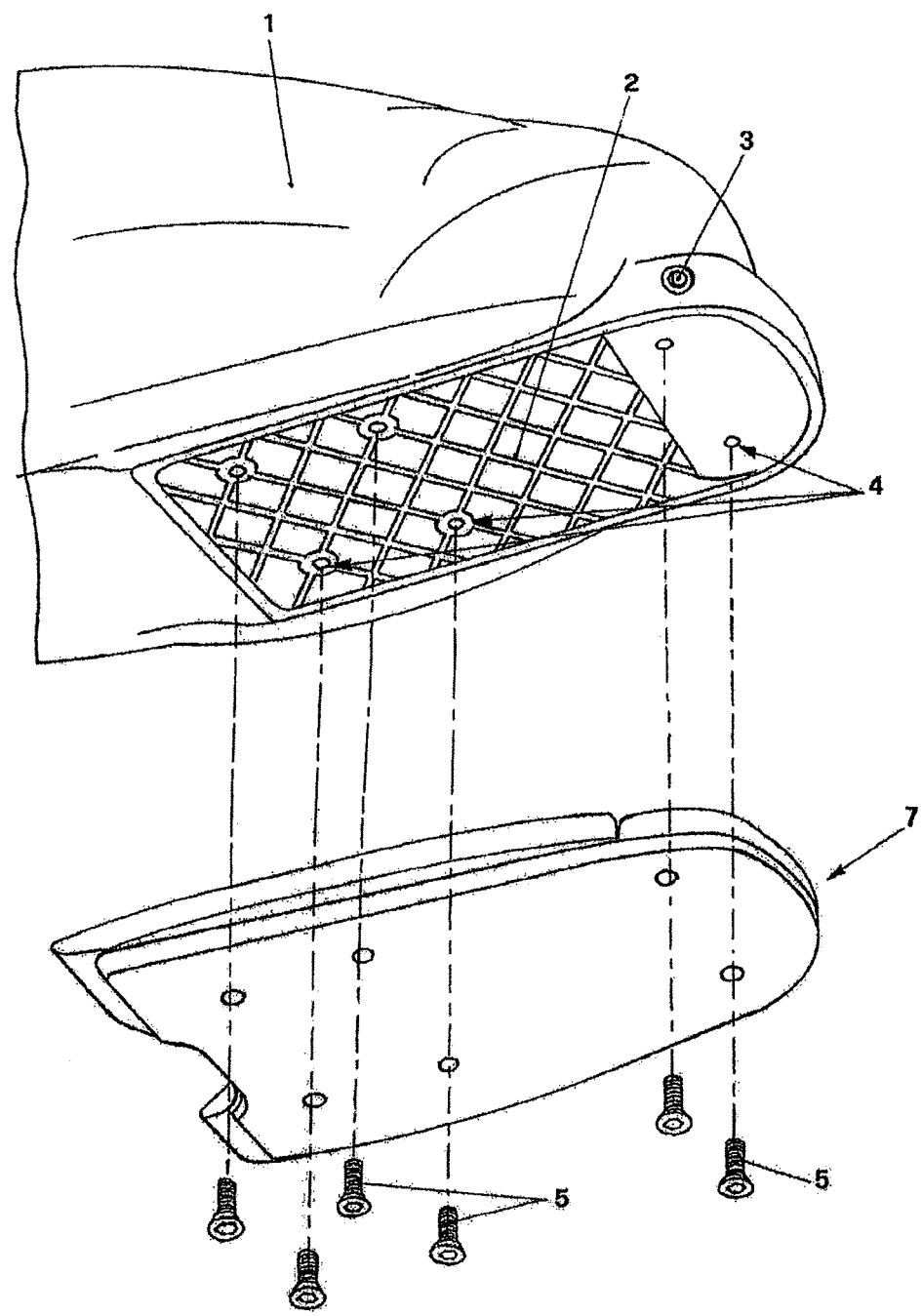
FIG. 7b shows an exploded view of the front of the ski boot carried out according to another embodiment of the present invention, wherein the hull and the front elements of the removable soles are illustrated separately.

As shown in FIGS. 7a and 7b, the hull 1 of the ski boot of the invention is provided, on the boot's front portion, with a plate 2 that is fixedly constrained to the underside of the hull. On the side walls of the rigid plate there are bushings 3 in which the pins of the standard DYNAFIT® ski binding can be fitted. The shaped recesses are positioned forward of a front end of the hull and rearward of a front end of the shaped rigid plate.

The plate 2 is provided on its bottom with seats 4 that are distributed uniformly and prepared for anchoring the front element of the removable soles 6 and 7 through fixing screws 5.

Both types of removable soles have shape and size that are compatible with those of the plate 2.

Furthermore, they are provided with through holes 8 oriented perpendicularly to the sole, whose number, size and position correspond to those of the seats 4 for the fixing screws present on the plate 2. An analogous system is provided for fixing the back element 11 and 12 of the soles to the corresponding plate.

The removable elements of the sole are improved with different characteristics, so that each embodiment satisfies the requisites of the regulations in force for ski gear to be used in the different skiing disciplines. In particular, the removable sole 6 developed specifically for uphill ski touring is made of rubber or composite materials and is a tank sole. The removable sole 7, developed specifically for downhill ski touring is rigid, smooth and shaped so as to meet the requisites of the related standard.

Figure 2:
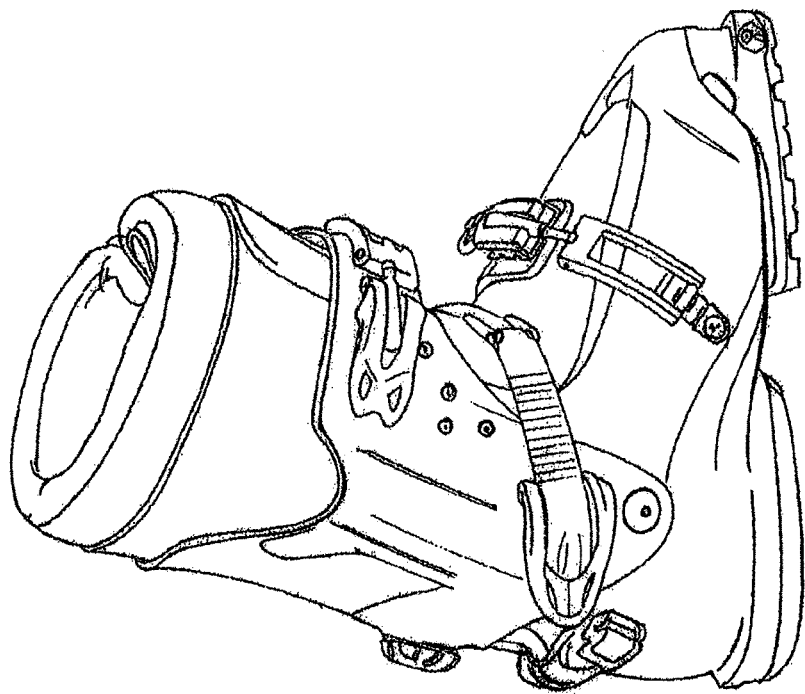
FIG. 2 shows an axonometric view of the ski touring boot adapted for going uphill, compatible with a standard DYNAFIT® ski binding belonging to the state of the art, in which the front element and the back element of the sole can be removed from the hull of the boot and the bushings are positioned on the front element of the removable sole.
Figure 1:
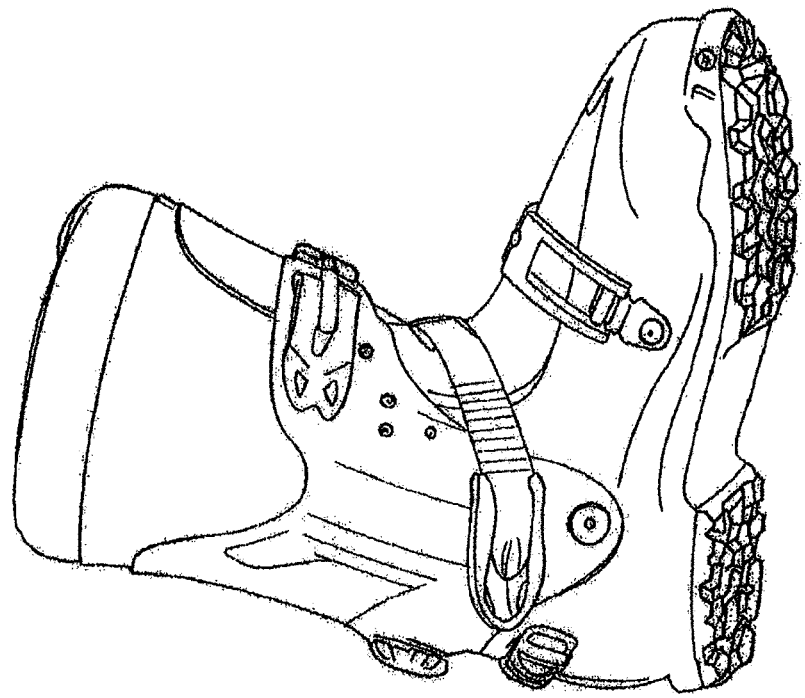
FIG. 1 shows an axonometric view from below of the ski touring boot adapted for going uphill, compatible with a standard DYNAFIT® ski binding belonging to the state of the art, in which the sole is fixedly constrained to the hull of the boot.
Figure 4:
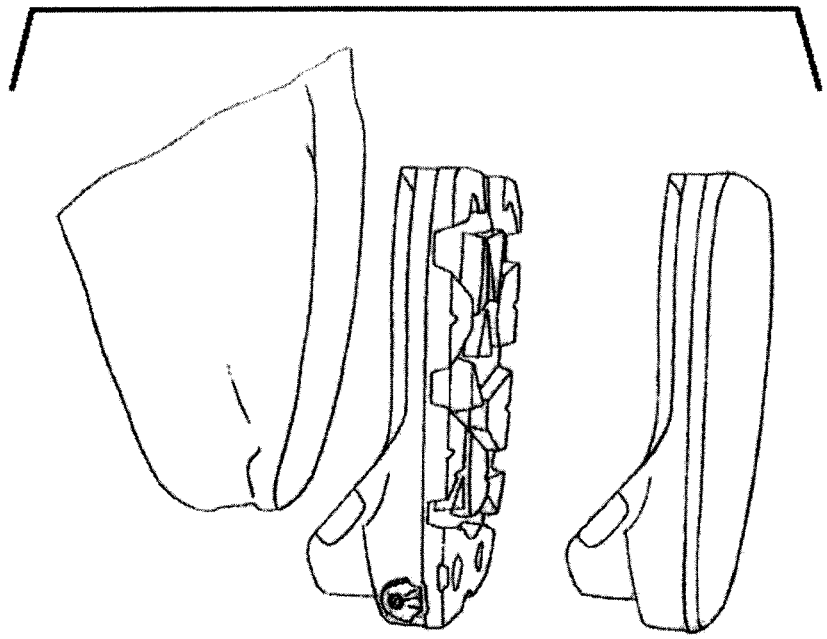
FIG. 4 shows an exploded view of the front of the ski touring boot carried out according to the state of the art, in which the hull and the front elements of the removable soles for going uphill and downhill are illustrated separately.
Figure 3:
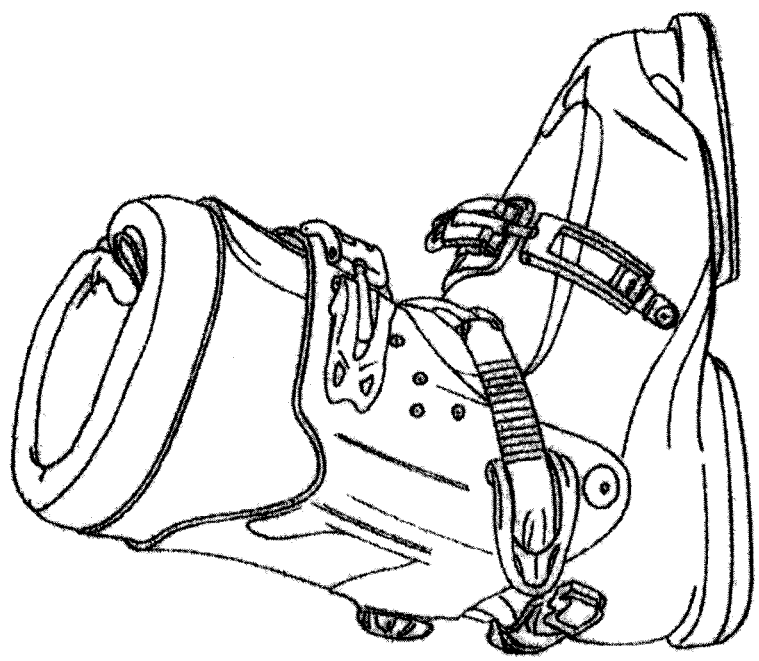
FIG. 3 shows an axonometric view of the ski touring boot adapted for going downhill and carried out according to the state of the art, in which the front element and the back element of the sole can be removed from the hull of the boot.
Figure 5:
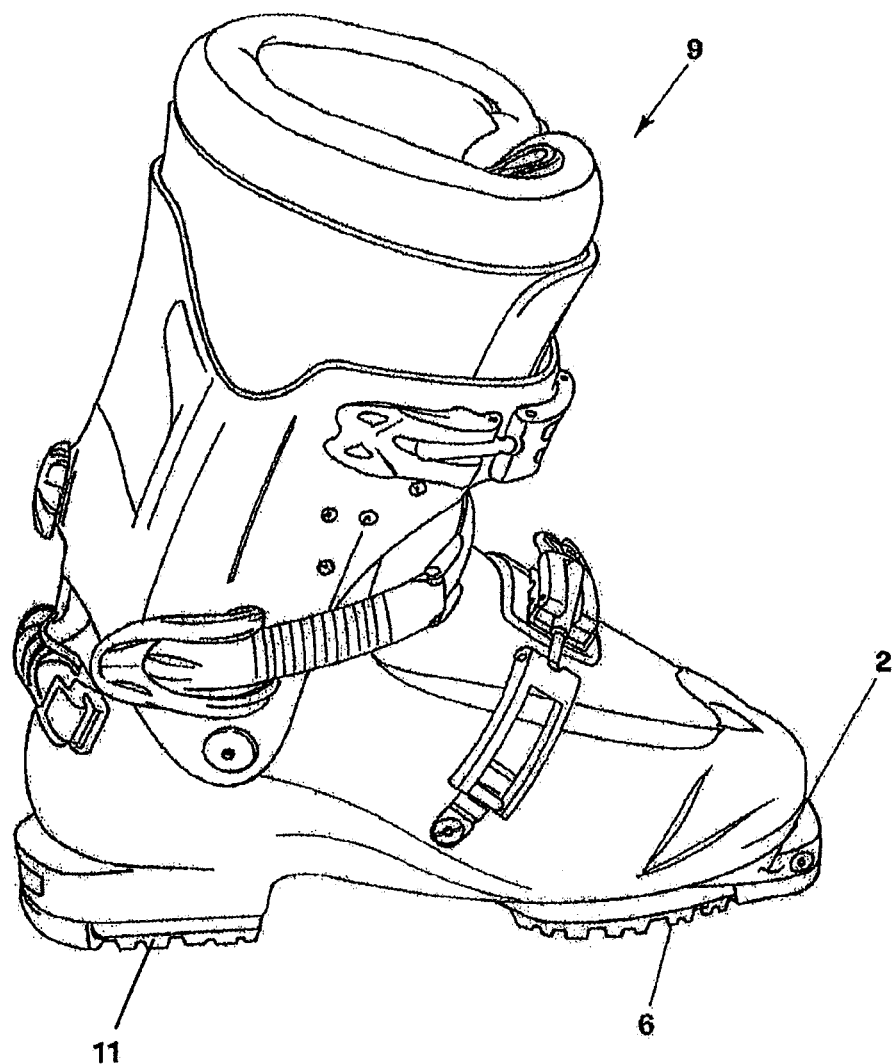
FIG. 5 shows an axonometric view of the ski touring boot that is the subject of the present invention, adapted for going uphill.
Figure 6:
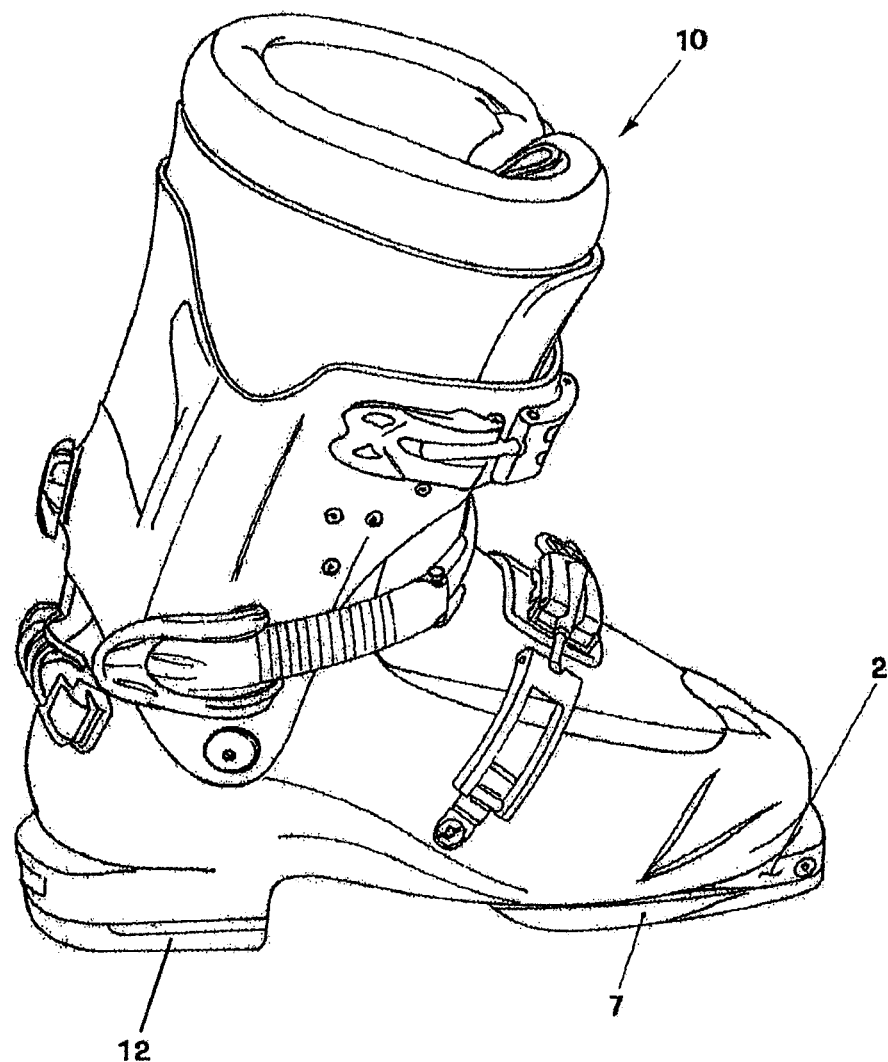
FIG. 6 shows an axonometric view of the ski touring boot that is the subject of the present invention, adapted for going downhill.

As shown in FIG. 5, by joining the plate 2 and the removable sole 6 used for uphill ski touring with the fixing screws 5, a ski boot 9 is obtained that is in compliance with the standards in force for uphill ski touring. Analogously, as shown in FIG. 6, by joining the plate 2 and the removable sole 7 used for downhill ski touring with the fixing screws 5, a ski boot 10 is obtained that is in compliance with the standards in force for downhill ski touring.

Figure 8:
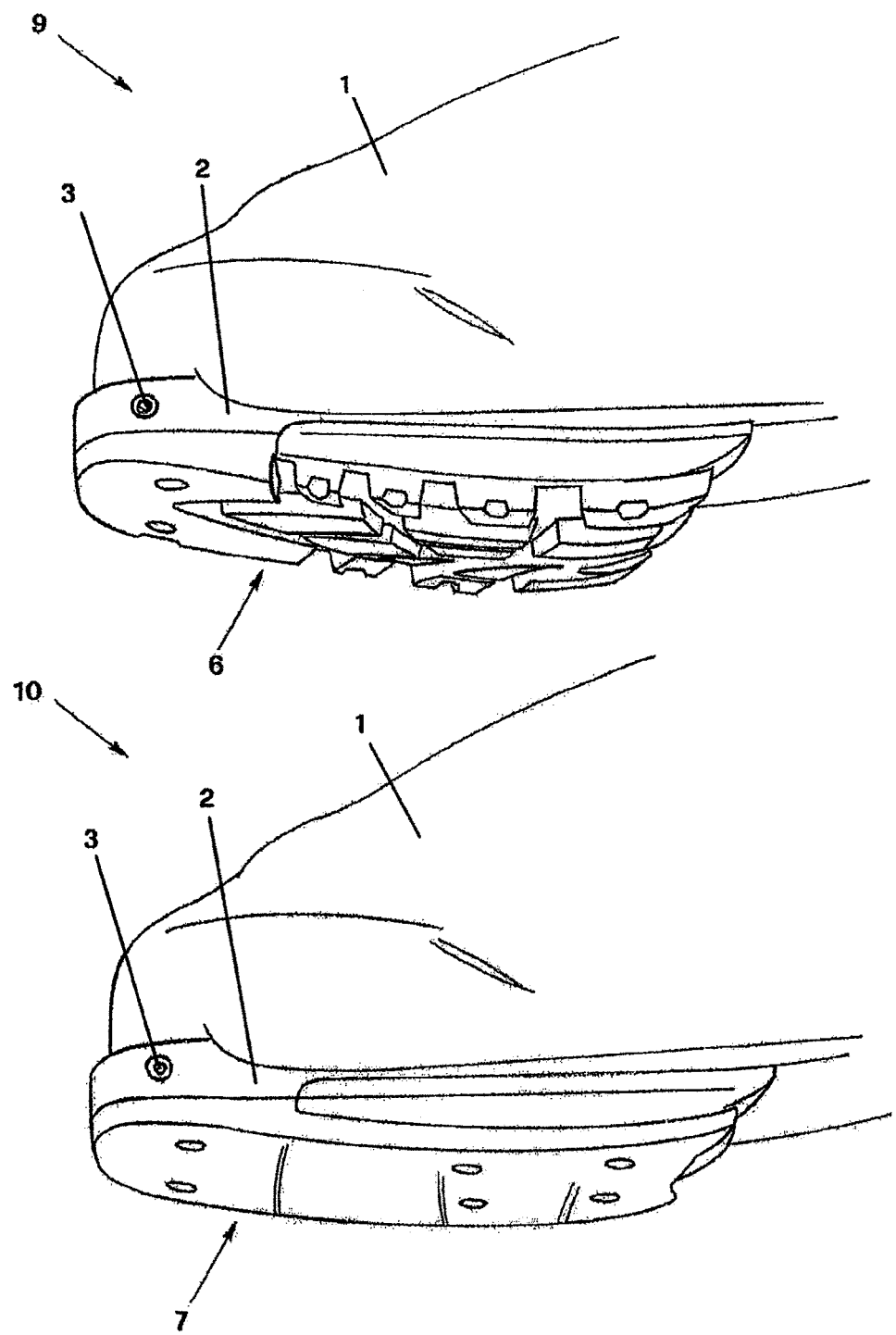
FIG. 8 shows an axonometric view from below of the front of the ski boot carried out according to the present invention, illustrating separately the front of the ski touring boot adapted for going uphill and the front of the ski touring boot adapted for going downhill.

The assembled front portions of the ski boots 9 and 10 are visible in FIG. 8. The clear advantage of the ski boot that is the subject of the invention lies in that, having a single hull, it is suited to house soles that can be connected to the hull and removed, suitable for both uphill and downhill ski touring.

The transformation of the ski boot suited for both uphill and downhill ski touring is very simple and can be quickly made by anyone.

The invention claimed is:

1. A ski boot, comprising:
   a hull,
   a shaped rigid plate belonging to said hull and being fixedly constrained to an underside of said hull, said shaped rigid plate comprising a front portion and a rear portion, said front portion having shaped recesses for accommodating pins of a ski binding adapted for releasing a heel of the ski boot to facilitate uphill climb movements, wherein said shaped recesses are positioned forward of a front end of said hull and rearward of a front end of said shaped rigid plate;
   two removable soles adapted to be removably connected to said shaped rigid plate of said hull and interchangeable, each of said two removable soles comprising a front portion and a back portion that are separated from each other and removably constrained to said shaped rigid plate of said hull via fixing screws, said front and back portions of each of said two removable soles being adapted to be removably connected to said front and rear portions of said shaped rigid plate, respectively;
   said two removable soles each respectively comprising a first removable tank sole adapted for uphill ski touring with release of the heel of the ski boot and being made of rubber, and a second rigid sole adapted for downhill ski touring and having a smooth and rigid underside, wherein a first of said two removable soles is a removable tank sole, and a second of said two removable soles is a rigid sole; and
   wherein said shaped recesses are positioned on sides of said front portion of said shaped rigid plate that is part of said hull, wherein said plate is configured to receive said two removable soles.

2. The ski boot according to claim 1, wherein said shaped recesses of said shaped rigid plate are constituted by bushings.

3. A ski boot, comprising:
   a hull,
   a shaped rigid plate belonging said hull and being fixedly constrained to an underside of said hull, said shaped rigid plate comprising a front portion and a rear portion, said front portion having shaped recesses on opposing sides of said front portion for accommodating pins of a ski binding adapted for releasing a heel of the ski boot to facilitate uphill climb movements, wherein said shaped recesses are positioned forward of a front end of said hull and rearward of a front end of said shaped rigid plate;

two removable soles adapted to be removably connected to said shaped rigid plate of said hull and interchangeable, each of said two removable soles comprising a front portion and a back portion that are separated from each other and removably constrained to said shaped rigid plate of said hull, said front and back portions of each of said two removable soles being adapted to be removably connected to said front and rear portions of said shaped rigid plate, respectively;

said two removable soles comprising a first removable sole and a second removable sole, said first removable sole is a removable tank sole adapted for uphill ski touring with release of the heel of the ski boot, and said second removable sole is a rigid sole adapted for downhill ski touring and having a smooth and rigid underside;

wherein said front portion of said shaped rigid plate is configured to receive part of said two removable soles.

* * * * *